(12) United States Patent
Guerrero, Jr.

(10) Patent No.: US 10,802,608 B2
(45) Date of Patent: Oct. 13, 2020

(54) HEIGHT-ADJUSTABLE INPUT DEVICE COMPRISING FASTENING MEMBER

(71) Applicant: RAZER (ASIA-PACIFIC) PTE. LTD., Singapore (SG)

(72) Inventor: Gil Palma Guerrero, Jr., Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/467,849

(22) PCT Filed: Dec. 14, 2016

(86) PCT No.: PCT/SG2016/050602
§ 371 (c)(1),
(2) Date: Jun. 7, 2019

(87) PCT Pub. No.: WO2018/111185
PCT Pub. Date: Jun. 21, 2018

(65) Prior Publication Data
US 2019/0302829 A1 Oct. 3, 2019

(51) Int. Cl.
*G06F 3/0338* (2013.01)
*G05G 1/06* (2006.01)
(Continued)

(52) U.S. Cl.
CPC ............ *G06F 3/0338* (2013.01); *G05G 1/06* (2013.01); *G05G 9/047* (2013.01); *G06F 3/016* (2013.01);
(Continued)

(58) Field of Classification Search
CPC ......... G05G 9/047; G05G 2009/04774; G05G 1/06; G06F 3/0362; G06F 3/0338;
(Continued)

(56) References Cited

U.S. PATENT DOCUMENTS 3,998,109 A * 12/1976 O'Brien .................. F16H 59/10
74/473.23
4,124,787 A 11/1978 Aamoth et al.
(Continued)

FOREIGN PATENT DOCUMENTS

WO WO 2013/043509 A2 3/2013

OTHER PUBLICATIONS

Extended European Search Report dated Oct. 24, 2019, 10 pages, for the corresponding European Patent Application No. 16924121.3.
(Continued)

*Primary Examiner* — Darlene M Ritchie
(74) *Attorney, Agent, or Firm* — Polsinelli PC

(57) ABSTRACT

According to various embodiments, there is provided an input device including a handle configured to receive a force exerted by a user; a shaft coupled to the handle such that the force exerted on the handle is at least partially received on the shaft; wherein the handle is displaceable along a height of the shaft; wherein the handle includes a fastening member releasably biased to exert a force on a upper portion of the shaft in a direction at least substantially perpendicular to the height of the shaft.

19 Claims, 5 Drawing Sheets

(51) Int. Cl.
    *G05G 9/047* (2006.01)
    *G06F 3/01* (2006.01)
    *G06F 3/0362* (2013.01)
(52) U.S. Cl.
    CPC . *G06F 3/0362* (2013.01); *G05G 2009/04774* (2013.01); *G06F 2203/015* (2013.01)
(58) Field of Classification Search
    CPC .... G06F 3/016; G06F 3/011; G06F 2203/015; G07F 17/3209; G07F 17/3223; G07F 17/3216; G07F 17/3227; G07F 17/326; H04B 2001/1045; H04B 2001/1054; H04B 2001/1072; H04B 2201/70728; H04B 2201/709709; H04B 2201/709745; H04B 10/25; H04B 15/00; H04B 17/00; H04B 17/21; H04B 17/26; H04B 17/309; H04B 17/318; H04B 17/327; H04B 17/336; H04B 17/373; H04B 17/345; H04B 1/38; H04B 1/709; H04B 1/7097; H04B 1/71; H04B 1/1036; H04B 1/7103; H04B 1/713; H04B 1/7143; H04B 7/0417; H04B 7/0456; H04B 7/046; H04B 7/0617; H04B 7/0626; H04B 7/063; H04B 7/10; H04B 7/18504; H04B 7/18506; H04B 7/2634; G06T 19/003; G06T 19/006; G16H 40/63; A61B 34/20
    See application file for complete search history.

(56) References Cited

U.S. PATENT DOCUMENTS

| | | | |
|---|---|---|---|
| 4,395,134 A | 7/1983 | Luce | |
| 5,011,149 A | 4/1991 | Purnell | |
| 5,675,359 A * | 10/1997 | Anderson | G05G 9/047 200/6 R |
| 5,995,034 A * | 11/1999 | Liu | G05G 9/047 341/161 |
| 6,433,777 B1 * | 8/2002 | Sawyer | G06F 1/1616 345/161 |
| 6,826,042 B2 | 11/2004 | Oross et al. | |
| 7,728,814 B1 | 6/2010 | Ansari et al. | |
| 7,978,186 B2 | 7/2011 | Vassallo et al. | |
| 8,059,090 B2 | 11/2011 | Ekstrand | |
| 8,350,345 B2 | 1/2013 | Vaganov | |
| 8,816,962 B2 | 8/2014 | Obermeyer et al. | |
| 9,044,668 B2 | 6/2015 | Taniguchi | |
| 9,052,736 B2 | 6/2015 | Kreider et al. | |
| 2003/0061894 A1 | 4/2003 | Itagaki | |
| 2005/0057502 A1 | 3/2005 | Arneson et al. | |
| 2005/0195166 A1 * | 9/2005 | Cooper | G05G 9/047 345/161 |
| 2006/0176273 A1 | 8/2006 | Wolfe | |
| 2007/0164996 A1 | 7/2007 | Gould | |
| 2012/0260763 A1 * | 10/2012 | Terao | G05G 1/08 74/507 |
| 2014/0094310 A1 | 4/2014 | Bleich et al. | |
| 2014/0210717 A1 | 7/2014 | Hoover, Jr. et al. | |
| 2014/0251070 A1 | 9/2014 | Kornelson | |
| 2015/0338874 A1 | 11/2015 | Weigl | |
| 2017/0189799 A1 * | 7/2017 | Anderson | G06F 3/0202 |

OTHER PUBLICATIONS

Telescopic Joystick, 700 IBM Technical Disclosure Bulletin, vol. 31 Apr. 1989, No. 11, Armonk, NY, US, pp. 288-289.
International Search Report and Written Opinion, dated Sep. 8, 2017, for the corresponding International Application No. PCT/SG2016/050602 in 12 pages.
Block, Gerry "kontrolfreek's FPS Freek Prototype Hands-On", Feb. 6, 2008, https://www.ign.com/articles/2008/02/06/kontrolfreeks-fps-freek-prototype-hands-on, 4 pages.
Modboards, https://www.guitarfetish.com/MODboards c 30.html, 3 pages.

* cited by examiner

HEIGHT-ADJUSTABLE INPUT DEVICE COMPRISING FASTENING MEMBER

TECHNICAL FIELD

Various embodiments relate to input devices, for example, joysticks.

BACKGROUND

Input devices are devices that allow users to provide information into computing devices, for interacting with applications running on the computing devices. The computing devices referred herein may be a broad category including personal computers, game consoles, mobile devices and simulators. Common input devices include mice, keyboards, gamepads and joysticks. The joystick is a popular input device for garners, as it is intuitive to use in games that require hand-eye coordination, such as flight simulation games and first-person shooter games. Joysticks typically include a handle that is coupled to a shaft or stick. The shaft may be pivotable about its base. A user can provide inputs to the application by exerting a force on the handle. The category of joysticks may include stick controllers and thumbsticks. A user may manipulate a stick controller by grasping the handle in the palm with his fingers wrapped around the handle and exerting a force on the handle by moving his arm. A user may manipulate a thumbstick by placing his thumb on top of the handle and exerting a force on the handle by shifting his thumb. In either case, the user may have a preferred height for the handle. For a stick controller, a taller handle may provide finer degree of control as compared to a shorter handle because the amount of displacement at the top part of the handle relative to the amount of rotation at the base is proportional to the height of the handle. As such, the optimal height of the handle may depend on the degree of control that is desired. As for a thumbstick, the optimal height of the handle may depend on the length of the user's thumb. Having a thumbstick that is too short or too tall may cause the user to strain his thumb. Therefore, there is a need for a height-adjustable joystick input device.

SUMMARY

According to various embodiments, there may be provided an input device including a handle configured to receive a force exerted by a user; a shaft coupled to the handle such that the force exerted on the handle is at least partially received on the shaft; wherein the handle is displaceable along a height of the shaft; wherein the handle includes a fastening member releasably biased to exert a force on a upper portion of the shaft in a direction at least substantially perpendicular to the height of the shaft.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
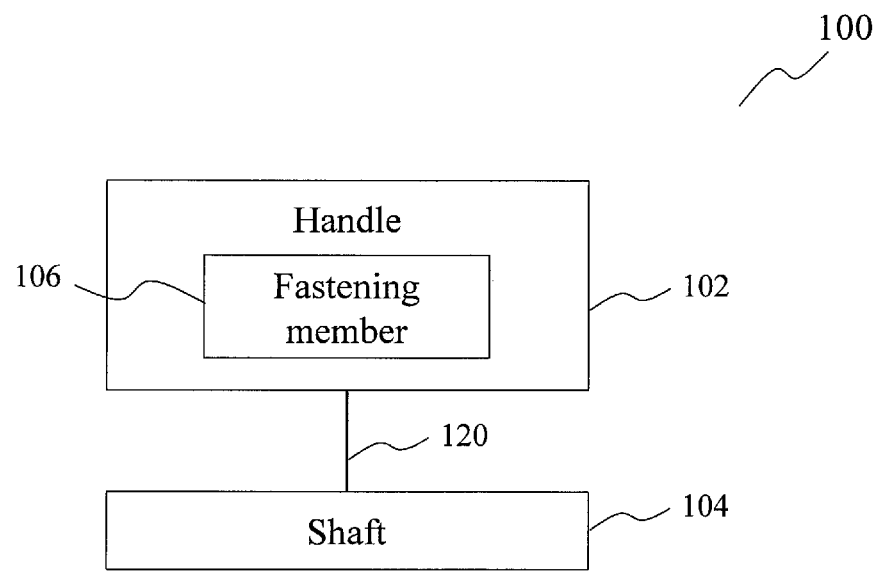
FIG. 1 shows a block diagram of an input device according to various embodiments.

Embodiments described below in context of the input devices are analogously valid for the respective methods, and vice versa. Furthermore, it will be understood that the embodiments described below may be combined, for example, a part of one embodiment may be combined with a part of another embodiment.

It will be understood that any property described herein for a specific input device may also hold for any input device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Input devices are devices that allow users to provide information into computing devices, for interacting with applications running on the computing devices. The computing devices referred herein may be a broad category including personal computers, game consoles, mobile devices and simulators. Common input devices include mice, keyboards, gamepads and joysticks. The joystick is a popular input device for garners, as it is intuitive to use in games that require hand-eye coordination, such as flight simulation games and first-person shooter games. Joysticks typically include a handle that is coupled to a shaft or stick. The shaft may be pivotable about its base. A user can provide inputs to the application by exerting a force on the handle.

The category of joysticks may include stick controllers and thumbsticks. A user may manipulate a stick controller by grasping the handle in the palm with his fingers wrapped around the handle and exerting a force on the handle by moving his arm. A user may manipulate a thumbstick by placing his thumb on top of the handle and exerting a force on the handle by shifting his thumb. In either case, the user may have a preferred height for the handle. For a stick controller, a taller handle may provide finer degree of control as compared to a shorter handle because the amount of displacement at the top part of the handle relative to the amount of rotation at the base is proportional to the height of the handle. As such, the optimal height of the handle may depend on the degree of control that is desired. As for a thumbstick, the optimal height of the handle may depend on the length of the user's thumb. Having a thumbstick that is too short or too tall may cause the user to strain his thumb. Therefore, there is a need for a height-adjustable joystick input device.

According to various embodiments, an input device for example, a joystick, may have a height-adjustable controller stick. The height of the controller stick may be adjustable according to a user's preference, for example to suit the user's palm size or length of fingers. The controller stick may be operable at the adjusted height. The controller stick may include a handle arranged on top of a shaft. The handle may serve as a contact point for a user to manipulate the shaft. The force exerted by the user on the handle is at least partially transferred to the shaft. The handle may include a fastening member for engaging the shaft. The handle may be displaceable along the height of the shaft, so that the overall height of the controller stick may be adjusted. The displacement of the handle relative to the shaft may be constrained to the vertical direction, i.e. along the height of the shaft. The fastening member may be operated to disengage the shaft, when the height of the handle is to be adjusted. After the handle has been displaced along the height of the shaft to achieve the desired height for the controller stick, the fastening member may be operated to engage the shaft, so that the handle is prevented from moving relative to the shaft. The fastening member may engage the shaft by at least one of an interlocking mechanism or a frictional force between the shaft and the fastening member.

According to various embodiments, the fastening member may clasp or grip the shaft by exerting a force on the shaft. The force may include a force component that is at least substantially perpendicular to the surface of the shaft, or at least substantially perpendicular to a height of the shaft. The fastening member may include a first fastener and a second fastener, for example a pair of levers or a pair of pegs or a pair of clamps. The first fastener may exert a first force on the shaft and the second fastener may exert a second force on the shaft. Each of the first force and the second force may be at least substantially perpendicular to the surface of the shaft, or at least substantially perpendicular to a height of the shaft. The first force may oppose the second force. The magnitude of the first force may be equal to the second force. The fastening member may be biased towards the shaft, by a biasing member such as a spring, so as to exert the force such as the first force and the second force, on the shaft. The fastening member may be operated to disengage or loosen from the shaft, i.e. to remove the force exerted by the fastening member on the shaft. The fastening member may be disengaged from the shaft by compressing the biasing member. The biasing member may be allowed to return to its default form, so that the fastening member is again biased to exert a force on the shaft, when the fastening member is operated to engage the shaft. By vertically displacing the handle when the fastening member is loosened, and then releasing the biasing member to re-tighten the fastening member against the shaft, the height of the controller stick may be adjusted.

According to various embodiments, the shaft may have an upper portion where the fastening member is configured to exert a force against. The upper portion may be separately fabricated from the remaining portion of the shaft. The upper portion may be made from a rigid material. The upper portion may be shaped to receive the fastening member. The upper portion may include coupling structures or receiving portions such as holes, notches, depressions, indentations or recessed areas. The coupling structures may be arranged along the height of the upper portion. The coupling structures may be shaped to snugly receive the fastening member. The coupling structures and the fastening member may have complementary shapes such that the fastening member can be locked in any one of the coupling structures. The 'locking' of the fastening member to any one of the coupling structure may constrain the handle to a particular vertical position and hence determine the height of the controller stick. The fastening member may be displaced from a first position where the fastening member is snugly received in the coupling structure of the shaft, to a second position where the fastening member is outside of the coupling structure. When the fastening member is at the second position, the handle may be displaceable relative to the height of the shaft. When the fastening member is back at the first position, the handle may be locked to the upper portion such that the handle is not displaceable relative to the shaft.

According to various embodiments, the input device may be a self-contained peripheral device such as a joystick. The input device may include buttons for activating controls in an application running on a computing device that is coupled to the input device.

According to various embodiments, the input device may be part of a larger peripheral device. For example, the input device may be a button or a thumbstick on a mobile phone or a gaming controller.

FIG. 1 shows a block diagram of an input device 100 according to various embodiments. The input device 100 may include a handle 102 configured to receive a force exerted by a user. The input device 100 may further include a shaft 104 coupled to the handle 102 such that the force exerted on the handle 102 is at least partially received on the shaft 104. The handle 102 may be displaceable along a height of the shaft 104. The handle 102 may include a fastening member 106 releasably biased to exert a force on an upper portion of the shaft 104 in a direction at least substantially perpendicular to the height of the shaft 104. The handle 102 and the shaft 104 may be coupled with each other, like indicated by line 120, for example mechanically coupled. The input device 100 may be a controller device for a computing system, or in other words, a computer peripheral device. The input device 100 may be, for example, a joystick, a control stick, a thumbstick or an analog stick.

In other words, according to various embodiments, an input device may include a handle 102 and a shaft 104. The handle 102 may include a fastening member 106. The handle 102 may be configured to receive a force exerted by a user. The user may exert the force on the handle 102 to provide an input to a computing device that the input device is coupled to. For example, the user may push the handle 102 towards the left, so as to shift an onscreen cursor to the left, or to control a game avatar to run towards the left. The shaft 104 may be coupled to the handle 102 such that the force exerted on the handle 102 is at least partially received on the shaft 104. In other words, the user indirectly exerts a force on the shaft 104, by manipulating the handle 102 since the handle 102 and the shaft 104 are configured to move together. The handle 102 may be displaceable along the height of the shaft 104. The shaft 104 may include an upper portion. The fastening member 106 may be releasably biased to exert a force on the upper portion in a direction at least substantially perpendicular to the height of the shaft 104. The fastening member 106 may be biased such that it exerts the force on the upper portion of the shaft 104. The fastening member 106 may be releasable from exerting the force on the upper portion. When the fastening member 106 is exerting the force on the upper portion, the handle 102 may not be displaceable. When the fastening member 106 is released from exerting the force on the upper portion, the handle 102 may be displaceable along the height of the shaft 104.

Figure 2:
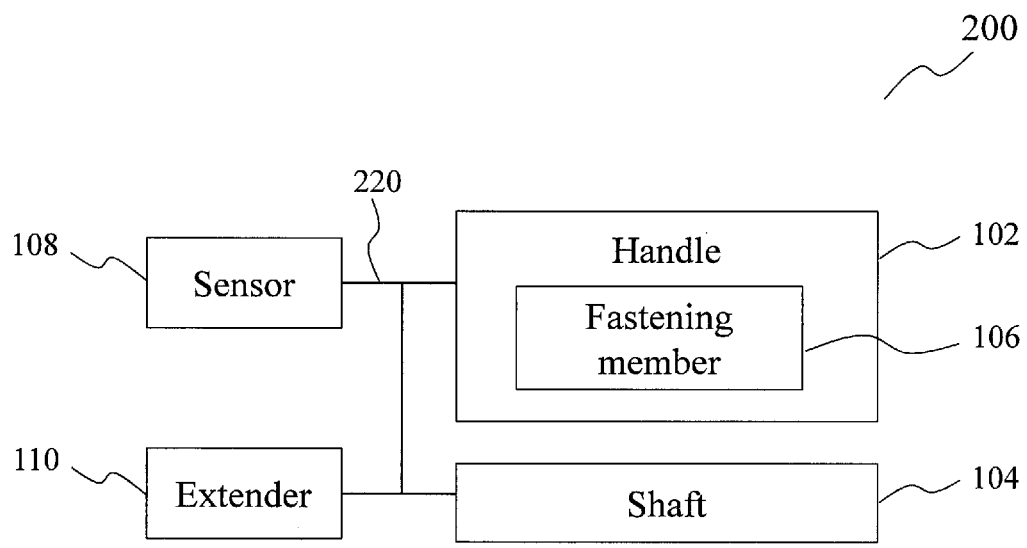
FIG. 2 shows a block diagram of an input device according to various embodiments.

FIG. 2 shows a block diagram of an input device 200 according to various embodiments. The input device 200 may be similar to the input device 100 in that it includes the handle 102 and the shaft 104. The input device 200 may further include a sensor 108 and an extender 110. The sensor 108 may be configured to provide a sensing output based on the force received on the shaft 104. The extender 110 may be coupled to the handle 102, the extender 110 configured to at least partially enclose the upper portion of the shaft 104. The handle 102, the shaft 104, the sensor 108 and the extender 110 may be coupled with each other, like indicated by lines 220, for example mechanically coupled or electrically coupled.

According to various embodiments, a method for manufacturing an input device may be provided. The method may include providing a handle, the handle being configured to receive a force exerted by a user. The method may further include coupling a shaft to the handle such that the force exerted by the user on the handle is at least partially received on the shaft. The handle may be displaceable along a height of the shaft. The handle may include a fastening member releasably biased to exert a force on an upper portion of the shaft, in a direction that is at least substantially perpendicular to the height of the shaft.

Figure 3A:
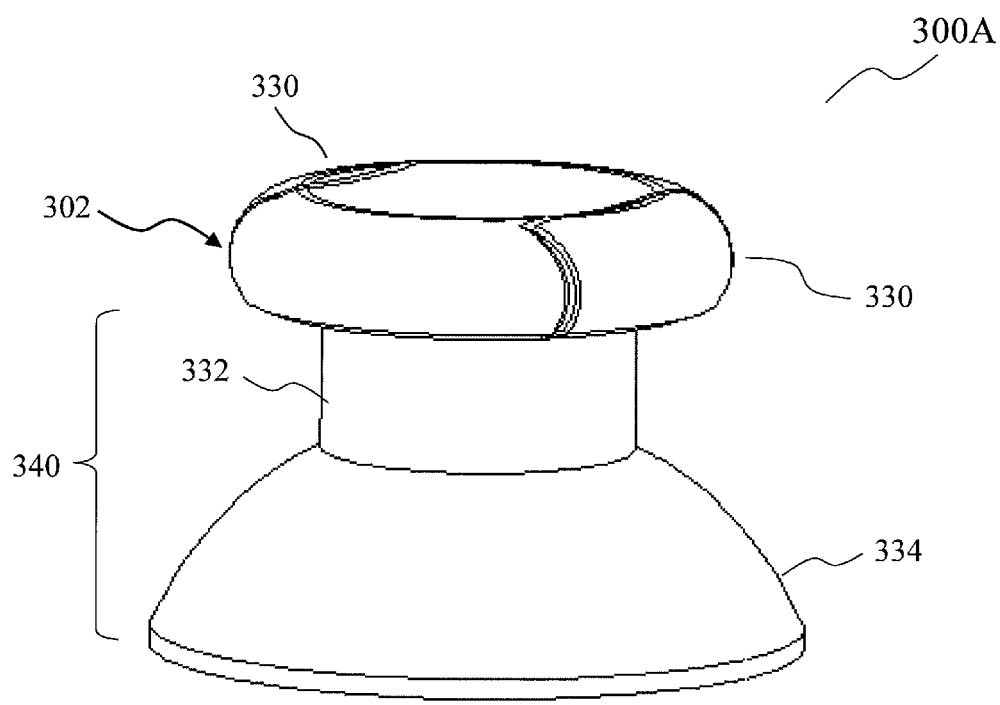
FIG. 3A shows a perspective view of an input device according to various embodiments, when the input device is at its default height.

FIG. 3A shows a perspective view 300A of an input device according to various embodiments, when the input device is at its default height. The input device may include a handle 302, a shaft and a fastening member, like the input device 100 or the input device 200. The input device may include a base 340. The base 340 may include an enclosure 332 and a cone 334. The cone 334 may be manufactured by die casting and may include soft aluminum.

The enclosure 332 and the cone 334 may be formed as an integral piece. The base 340 may house the sensor of the input device which may be identical or similar to the sensor 108, as well as the shaft. The enclosure 332 may at least partially surround the shaft and the sensor. The cone 334 may abut a housing of the input device or a housing of a game pad controller to which the input device is coupled. The sensor may sense either one of, or both of the direction and force exerted on the shaft. The sensor may then provide a signal to a computing device that the input device is coupled to, based on the sensed either one of or both of the direction and force exerted on the shaft. The signal may be used to control an application running on the computing device, or provide a user input to the application. The handle 302 may be identical to, or similar to the handle 102 of the input device 100 or 200. The shaft and the fastening member are not visible in the perspective view 300A as they are internal components of the input device. The shaft and the fastening member may be similar to, or identical to the handle 102 and the shaft 104 respectively. The handle 302 may include at least one lever 330 which is partially visible in the perspective view 300A. The lever 330 may include the fastening member.

Figure 3B:
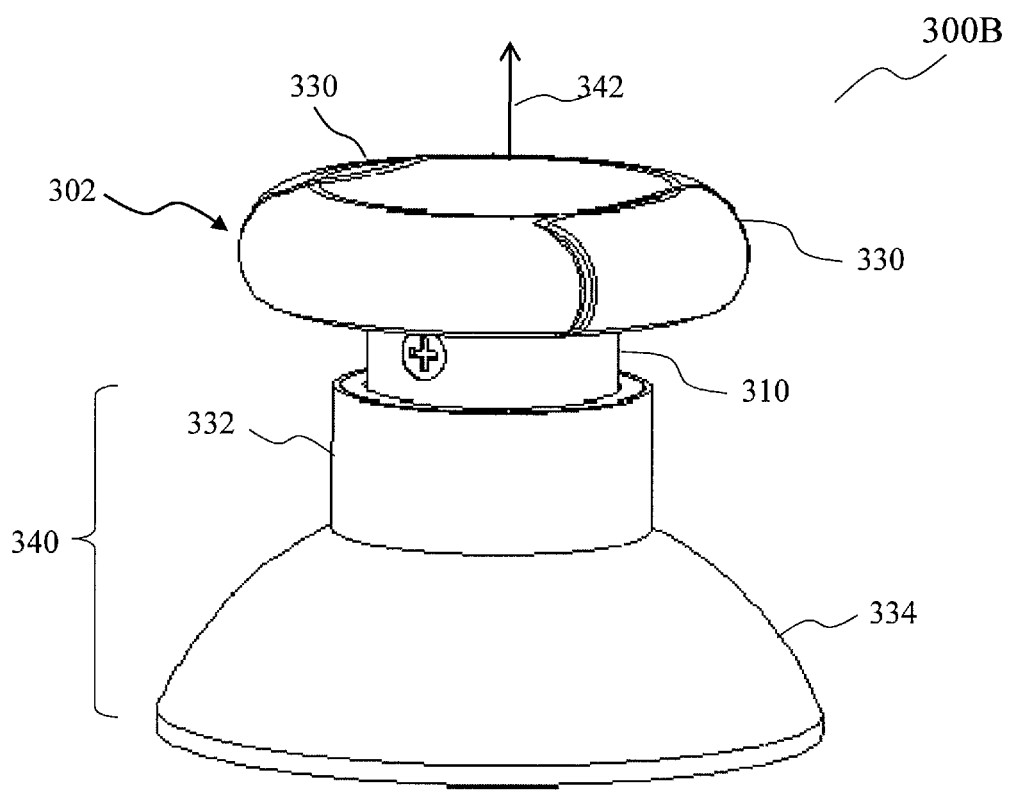
FIG. 3B shows a perspective view of the input device of FIG. 3A, when the input device is at an extended height.

FIG. 3B shows a perspective view 300B of the input device of FIG. 3A, when the input device is at an extended height. The handle 302 may be lifted up in the direction 342 when the lever 330 is operated to release the fastening member from the shaft. The operation mechanism will be described in more details in relation to FIG. 5. The direction 342 may be at least substantially parallel to the height of the shaft. The lever 330 may then be operated to secure the fastening member on the shaft, for example by biasing the fastening member on the shaft, or by engaging the fastening member into a coupling structure on the shaft. The coupling structure may be shaped to interlock the fastening member. The handle 302 may also be pushed back down to the configuration of FIG. 3A when the lever 330 is operated to release the fastening member from the shaft. When the handle 302 is pulled up, an extender 310 may be pulled up from within the enclosure 332. The extender 310 may be identical or similar to the extender 110. The extender 310 may serve to enclose the internal components of the input device including the shaft, when the input device is in an extended position, i.e. when the handle is displaced upwards. The extender 310 may protect the internal components of the input device from environmental elements such as dust and humidity.

Figure 4:
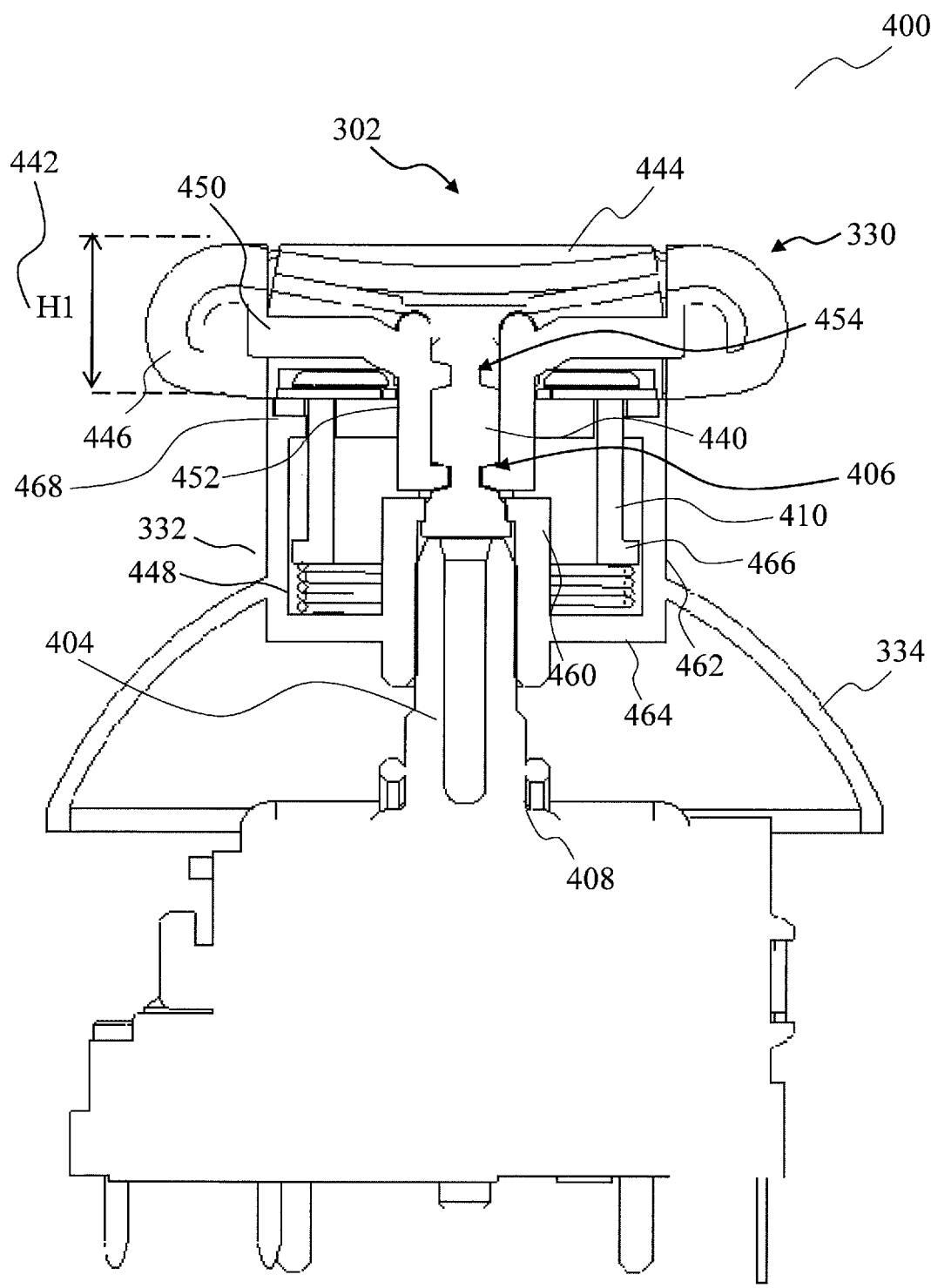
FIG. 4 shows a cross-sectional view of an input device according to various embodiments, when the input device is not extended.

FIG. 4 shows a cross-sectional view 400 of an input device according to various embodiments, when the input device is not extended, i.e. the handle 302 is at a default height. At the default height, the top surface of the handle 302 may be at a distance H1 442 away from the top of the enclosure 332. The cross-sectional view 400 shows the internal components of the input device, including the shaft 404, the lever 330, the fastening member 406 and the sensor 408. The shaft 404 may be anchored to the enclosure 332 such that the shaft 404 is not displaceable in the vertical direction. The vertical direction may be parallel to the height of the shaft 404. The handle 302 may include at least one lever 330. The cross-sectional view 400 shows an embodiment where there are two levers 330 although the quantity of levers may be one or more. The lever 330 may have a first arm 450 and a second arm 452. The first arm 450 may be arranged at least substantially perpendicular to the second arm 452, like an L-shape. The fastening member 406 may be part of the second arm 452. The fastening member 406 may extend out from the second arm 452 to abut the shaft 404 at an upper portion 440 of the shaft 404. The upper portion 440 may be elongated. The upper portion 440 may include a hard metal insert. The upper portion 440 may be an insert that is manufactured separately from the rest of the shaft 404. The upper portion 440 may be forced fit into the cone 334 during the manufacturing process. The upper portion 440 may include a plurality of coupling structures 454 arranged along a height of the upper portion 440. Each coupling structure 454 may be a depression, a recessed area or an indentation that may be complementary in shape to the fastening member 406. Each coupling structure 454 may be shaped to at least substantially engage with the fastening member 406. While the embodiment shown in FIG. 4 shows only two coupling structures 454, it should be understood that the quantity of coupling structures 454 can be one or more. The quantity of coupling structures 454 correspond to the various different heights that the handle 302 can be adjusted to. The input device may continue to be operable when the handle 302 is adjusted to any height of the various different heights. The handle 302 may be adjusted to any height of the various different heights so that the input device may be ergonomically catered to the user's hands. The fastening member 406 may include a protrusion or extension that is shaped to fit the coupling structure 454. The handle 302 may be constrained in movement, i.e. it cannot be displaced, when the fastening member 406 engages the coupling structure 454. The upper portion 440 may be anchored such that it is not moveable and therefore it may provide an opposing force to any vertical force acting on the handle 302, to resist the handle 302 from being extended or pushed down. The fastening member 406 may also be biased against the upper portion 440, i.e. pushed against the coupling structure 454, to exert a force on the upper portion in a direction at least substantially perpendicular to the upper portion 440. The biasing force may be provided by a spring. The first arm 450 may include a flexible covering 446, which may be a resilient material. The first arm 450 may be at least partially covered in the flexible covering 446. The handle may include two levers 330 which may be arranged symmetrically about the upper portion 440. The two levers 330 may be identical. The handle 302 may include a resilient material 444 on a top surface of the handle 302. The resilient material 444 may be formed of rubber or silicone. The top surface of the handle 302 faces away from the shaft 404. The resilient material 444 may be arranged adjacent to the lever(s) 330. When the handle 302 includes a pair of levers 330, the resilient material 444 may be arranged between the pair of levers 330. The handle 302 may be arranged above the enclosure 332. The enclosure 332 may at least partially enclose the shaft 404. The enclosure 332 may include an outer wall 462 and an inner wall 460. The inner wall 460 may at least partially surround the shaft 404. An extender 410 may be arranged between the outer wall 462 and the inner wall 460, such that when the input device is at a non-extended configuration, the extender 410 is enclosed within the enclosure 332. The extender 410 may be fitted within the enclosure 332. The extender 410 may include aluminum and may be manufactured by die casting.

The extender 410 may include a lip 466 that abuts an inner surface of the outer wall 462, so that the extender 410 may be guided by the enclosure 332 to displace in the vertical direction that is at least substantially parallel to the inner surface of the enclosure 332, as well as to the height of the shaft 404. The enclosure 332 may include a flange 468. The lip 466 may abut the flange 468 when the handle 302 is displaced up to a maximum distance from the shaft 404. The flange 468 may constrain the extender 410 from being decoupled or removed from the enclosure 332. A biasing member 448 such as a compression spring may be arranged under the extender 410. The biasing member 448 may be configured to bias the extender 410 and the handle 302 upwards, away from a floor 464 of the enclosure 332. The floor 464 may connect the outer wall 462 to the inner wall 460. The sensor 408 may be positioned within the cone 334 or underneath the cone 334. The sensor 408 may be configured to provide a sensing output based on the force received on the shaft 404. The shaft 404 may be rotatable, or maybe be anchored to be stationary. The sensing output may be indicative of at least one of a magnitude or a direction of the force received on the shaft 404. The sensing output may be provided to a computing device that is coupled to the input device, and may be translated into control commands for controlling an application running on the computing device. For example, the control command may determine the position of a cursor, or indicate the direction and intensity of an in-game attack move or the movements of a game character. The sensor 408 may be one of an optical sensor, a force feedback sensor or a potentiometer.

Figure 5:
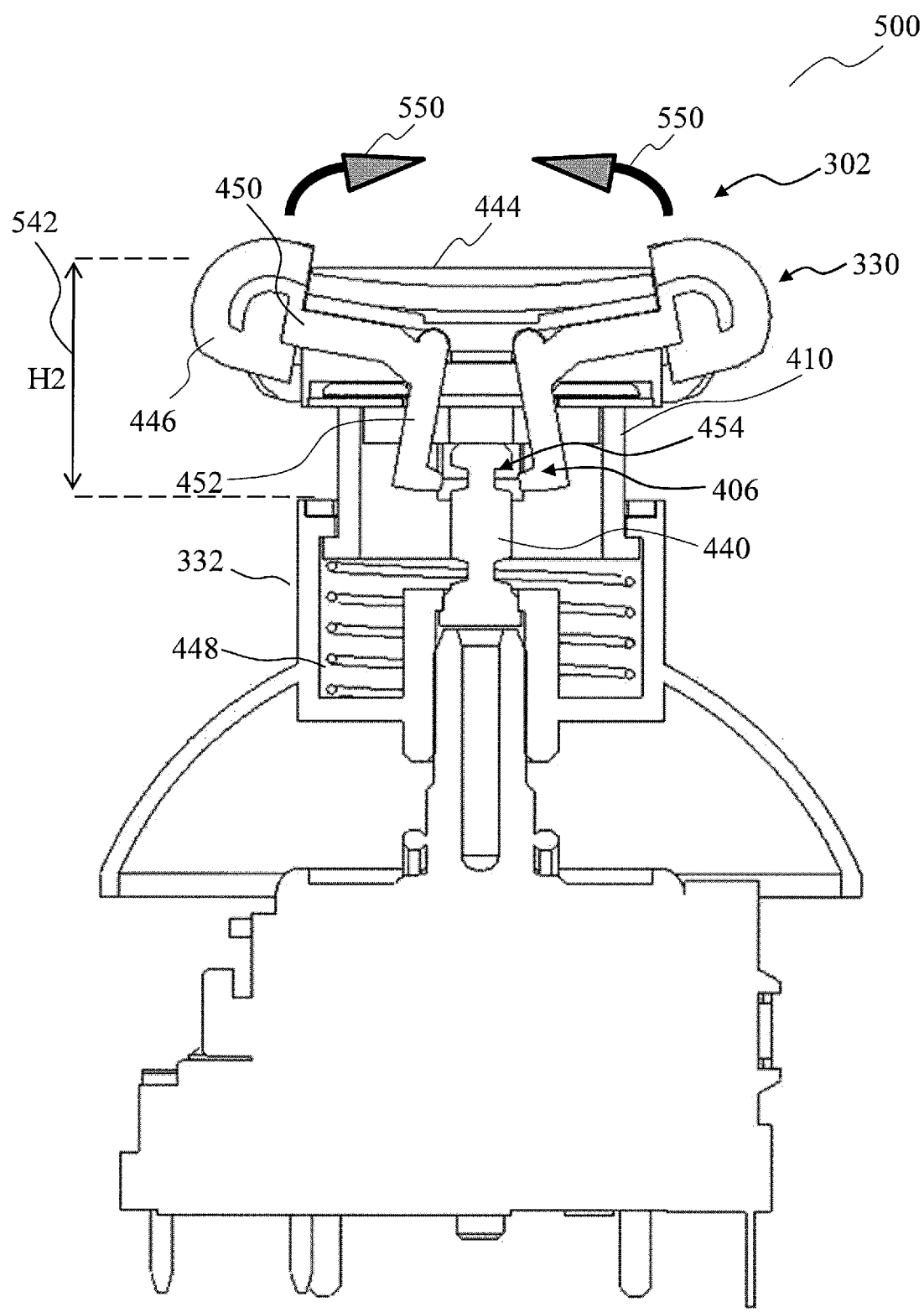
FIG. 5 shows a cross-sectional view of the input device of FIG. 4, when the input device is extended.

FIG. 5 shows a cross-sectional view 500 of the input device of FIG. 4, when the input device is extended, i.e. the handle 302 is displaced to an extended height. At the extended height, the top surface of the handle 302 may be at a distance H2 542 away from the top of the enclosure 332. A user may pull the lever 330 by the first arm 450, to disengage the fastening member 406 from the upper portion 440. The lever 330 may include a rigid frame such that pulling of the first arm 450 causes the second arm 452 to move accordingly. The lever 330 may be pivotable. The first arm 450 may be pulled out of the plane of the handle 302, causing the second arm 452 to rotate such that the fastening member 406 disengages from the coupling structure 454. The first arm 450 may be covered in the flexible material 446 at an end of the first arm 450, the end opposing the second arm 452. A user may operate the lever 330 by pulling the end of the first arm 450 in a direction at least substantially parallel to the height of the shaft 404. The first arm 450 may be pulled upwards, away from the floor 464 and inwards towards a centre of the handle 302. When the first arm 450 is pulled, the resilient material 444 may be deformed. The pulling direction for pulling the first arm 450 to cause the fastening member 406 to disengage, i.e. release the upper portion 440, may be indicated by the arrows 550. The handle 302 may be displaceable relative to the shaft 404 in a vertical direction, i.e. at least substantially parallel to a height of the shaft 404, so as to extend the height of the input device. When the fastening member 406 disengages the upper portion 440, the biasing member 448 may expand and thereby push the extender 410 and the handle 302 upwards, away from the shaft 404. The user may release the first arm 450, such that the second arm rotates back to engage the upper portion 440. When the first arm 450 is released, the fastening member 406 may engage another coupling structure 454. The other coupling structure 454 may be on a higher position along the height of the upper portion 440 than the coupling structure 454 that was previously engaged by the fastening member 406. As such, the vertical distance between the handle 302 and the shaft 404 is increased.

In an alternative embodiment (not shown), each coupling structure 454 may be a protrusion while the fastening member 406 may include an indentation or recessed area. The fastening member 406 may be shaped for receiving the protrusion. The fastening member 406 may be shaped to fit over the protrusion of the coupling structure 454 such that the fastening member 406 may snugly fit the coupling structure 454.

In yet another alternative embodiment (not shown), the upper portion 440 may be free from any coupling structure 454. The fastening member 406 may instead of being a protrusion or an indentation, have an at least substantially flat surface for contacting the upper portion 440. The fastening member 406 may be biased against the upper portion 440, such that the handle is not displaceable due to friction between the fastening member 406 and the upper portion 440.

According to various embodiments, the lever 330 may be locked into the position where the fastening member 406 is engaged with the coupling structure 454, in other words, constrained from disengaging the upper portion 440, by a catch mechanism such as a snap joint. The catch mechanism may include the fastening member 406 and the coupling structure 454. Alternatively, the catch mechanism may be separate from the fastening member 406 and may be coupled to the first arm 450. The catch mechanism may include a protruding part which may be deflected briefly to be caught in a depression in a mating component, when the lever 330 is pushed down for the fastening member 406 to engage the coupling structure 454.

According to various embodiments, at least one of the fastening member 406 or the upper portion 440 may include a non-slip surface, also referred herein as anti-slip surface.

Figure 6:
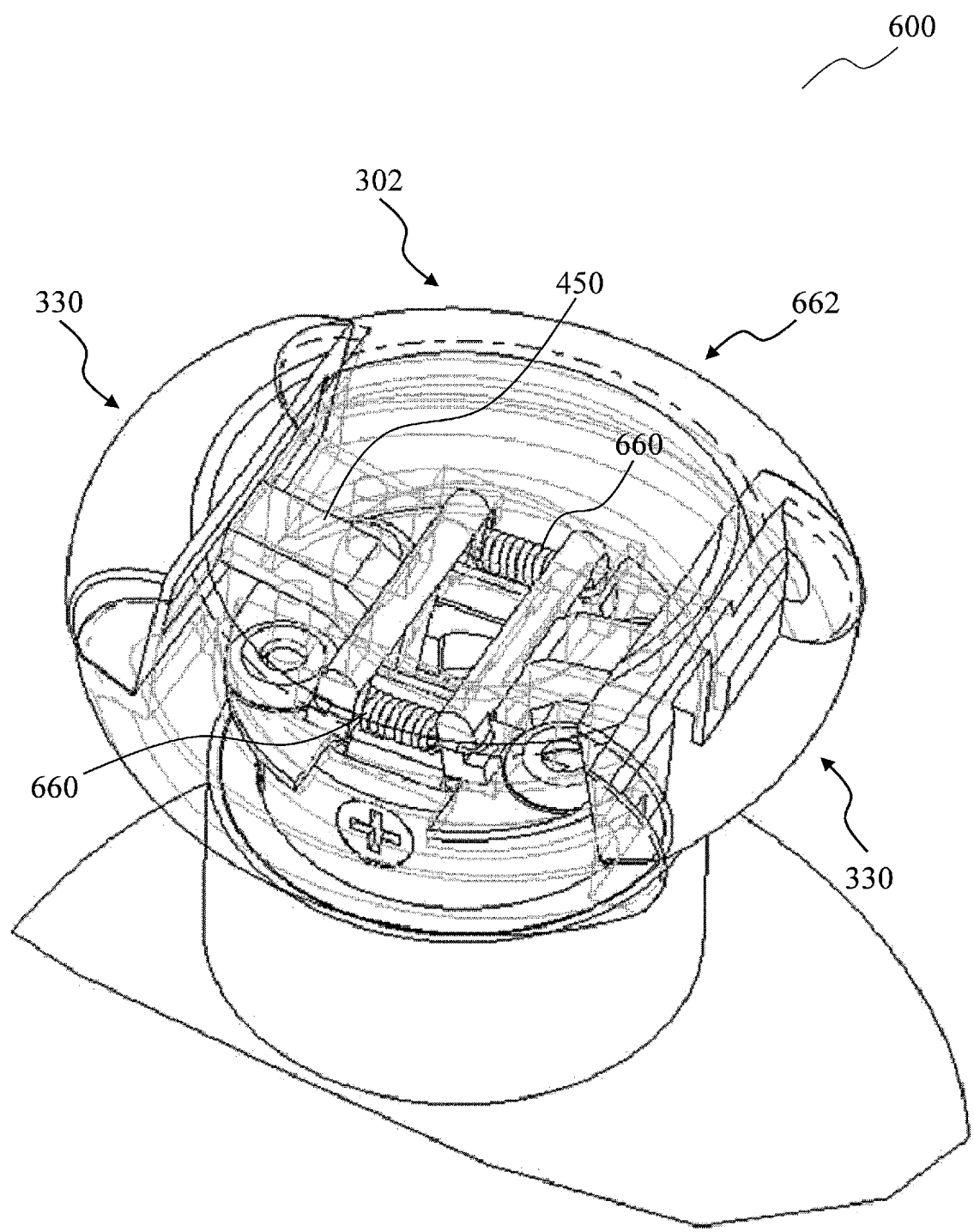
FIG. 6 shows a cutaway view of the handle of the input device of FIG. 4.

FIG. 6 shows a cutaway view 600 of the handle 302, showing the internal components of the handle 302. The handle 302 may include a cap 662, at least one lever 330 and at least one spring 660. The cap 662 is indicated only in outline in the cutaway view 600, so as to expose the firm arm 450 of the lever 330 and the spring 660. The cap 662 may define a plane at least substantially perpendicular to the height of the shaft. The cap may include at least one indentation, which is not shown in the cutaway view 600 as each indentation is occupied by part of a respective first arm 450. The lever 330 may fit at least substantially into the indentation, such that when the lever 330 is not being operated, the first arm 450 of the lever 330 appears to form a single planar surface with the cap 662. The cap may be shaped to receive a user's palm. For example, the cap 662 may be slightly rounded on its top surface for a user to comfortably grip the handle 302. The spring 660 may be configured to bias the first arm 450 towards being at least substantially conformal with the handle 302, such that the second arm 452 is pushed towards the upper portion 440. When the second arm 452 is pushed towards the upper portion 440, the fastening member 406 is also biased towards the upper portion 440 and may extend into one of the coupling structures 454 to lock the handle 302 into a particular vertical position. The spring 660 may be a tension spring. The spring 660 may be arranged between two levers 330, such that the two levers 330 are biased away from each other. When the two levers 330 are biased away from each other, their respective fastening members 406 may be biased to exert force on the upper portion 440 in the direction at least substantially perpendicular to the height of the shaft. When a user wishes to unlock the handle from the upper portion 440, the user may pull the levers 330 towards each other, thereby deforming the spring 660. When the user releases the levers 330, the spring 660 springs back into its default configuration which is at least substantially parallel to the plane of the handle 302, thereby pushing the levers 330 to return the plane of the handle 302.

The following examples pertain to further embodiments.

Example 1 is an input device including a handle configured to receive a force exerted by a user; a shaft coupled to the handle such that the force exerted on the handle is at least partially received on the shaft; wherein the handle is displaceable along a height of the shaft; wherein the handle includes a fastening member releasably biased to exert a force on an upper portion of the shaft in a direction at least substantially perpendicular to the height of the shaft.

In example 2, the subject-matter of example 1 can optionally include that the upper portion of the shaft is elongated.

In example 3, the subject-matter of example 1 or example 2 can optionally include that the upper portion of the shaft includes a hard metal insert.

In example 4, the subject-matter of any one of examples 1 to 3 can optionally include that the upper portion of the shaft has a plurality of coupling structures arranged along a height of the upper portion of the shaft, each coupling structure of the plurality of coupling structures shaped to at least substantially engage with the fastening member.

In example 5, the subject-matter of example 4 can optionally include that each coupling structure of the plurality of structures is a recessed area.

In example 6, the subject-matter of example 5 can optionally include that the fastening member includes a protrusion shaped to fit the recessed area.

In example 7, the subject-matter of example 4 can optionally include that each coupling structure of the plurality of structures is a protrusion.

In example 8, the subject-matter of example 7 can optionally include that the fastening member includes a recessed area shaped to fit over the protrusion.

In example 9, the subject-matter of any one of examples 1 to 8 can optionally include that the fastening member includes a non-slip surface for gripping the upper portion of the shaft.

In example 10, the subject-matter of any one of examples 1 to 9 can optionally include that the handle includes a lever, the lever having a first arm arranged at least substantially perpendicular to a second arm, wherein the second arm includes the fastening member.

In example 11, the subject-matter of example 10 can optionally include that the handle includes a resilient material arranged adjacent to the lever, wherein the resilient material is deformed when the first arm is pulled in a direction at least substantially parallel to the height of the shaft.

In example 12, the subject-matter of example 11 can optionally include that the resilient material is arranged on a top surface of the handle, wherein the top surface of the handle faces away from the shaft.

In example 13, the subject-matter of example 10 or example 11 can optionally include that the first arm is at least partially covered in a further resilient material.

In example 14, the subject-matter of any one of examples 10 to 13 can optionally include a further lever, wherein the lever and the further lever are arranged symmetrically about the upper portion of the shaft.

In example 15, the subject-matter of example 14 can optionally include a tension spring between the lever and the further lever, the tension spring configured to bias the fastening member to exert the force on the upper portion of the shaft in the direction at least substantially perpendicular to the height of the shaft.

In example 16, the subject-matter of any one of examples 10 to 15 can optionally include that the fastening member is released from the upper portion of the shaft when the first arm is pulled in a direction at least substantially parallel to the height of the shaft.

In example 17, the subject-matter of any one of examples 10 to 16 can optionally include that the first arm is biased towards being at least substantially conformal with the handle.

In example 18, the subject-matter of any one of examples 1 to 17 can optionally include a sensor configured to provide a sensing output based on the force received on the shaft.

In example 19, the subject-matter of example 18 can optionally include that the sensor is one of an optical sensor, a force feedback sensor or a potentiometer.

In example 20, the subject-matter of example 18 or example 19 can optionally include that the sensing output is indicative of at least one of a magnitude or a direction of the force received on the shaft.

In example 21, the subject-matter of any one of examples 1 to 20 can optionally include that the input device is a joystick.

In example 22, the subject-matter of any one of examples 1 to 21 can optionally include that the handle includes a cap and a lever, the cap defining a plane at least substantially perpendicular to the height of the shaft.

In example 23, the subject-matter of example 22 can optionally include that the cap includes an indentation, wherein the lever fits at least substantially into the indentation.

In example 24, the subject-matter of example 22 or example 23 can optionally include that the cap is shaped to receive a user's palm.

In example 25, the subject-matter of any one of examples 1 to 24 can optionally include an extender coupled to the handle, the extender configured to at least partially enclose the upper portion of the shaft.

In example 26, the subject-matter of example 25 can optionally include an enclosure including an outer wall and an inner wall, wherein the inner wall at least partially surrounds the shaft, and wherein the extender is arranged between the outer wall and the inner wall.

In example 27, the subject-matter of example 26 can optionally include that the extender is displaceable relative to the enclosure in a direction at least substantially parallel to the height of the shaft.

In example 28, the subject-matter of example 26 or example 27 can optionally include that the extender includes a lip abutting the outer wall.

In example 29, the subject-matter of example 28 can optionally include that the enclosure includes a flange, wherein the lip abuts the flange when the handle is displaced up to a maximum distance from the shaft.

In example 30, the subject-matter of any one of examples 26 to 29 can optionally include a spring configured to bias the extender away from a floor of the enclosure, wherein the floor connects the outer wall to the inner wall.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. An input device comprising:
   a handle configured to receive a force exerted by a user; and
   a shaft coupled to the handle such that the force exerted on the handle is at least partially received on the shaft;
   wherein the handle is displaceable along a height of the shaft;
   wherein the handle comprises a fastening member releasably biased to exert a force on an upper portion of the shaft in a direction at least substantially perpendicular to the height of the shaft, wherein the handle comprises a lever, the lever having a first arm arranged at least substantially perpendicular to a second arm, wherein the second arm comprises the fastening member.

2. The input device of claim 1, wherein the fastening member comprises a non-slip surface for gripping the upper portion of the shaft.

3. The input device of claim 1, wherein the handle comprises a resilient material arranged adjacent to the lever, wherein the resilient material is deformed when the first arm is pulled in a direction at least substantially parallel to the height of the shaft.

4. The input device of claim 1, wherein the fastening member is released from the upper portion of the shaft when the first arm is pulled in a direction at least substantially parallel to the height of the shaft.

5. The input device of claim 1, wherein the first arm is biased towards being at least substantially conformal with the handle.

6. The input device of claim 1, wherein the upper portion of the shaft has a plurality of coupling structures arranged along a height of the upper portion of the shaft, each coupling structure of the plurality of coupling structures shaped to at least substantially engage with the fastening member.

7. The input device of claim 6, wherein each coupling structure of the plurality of coupling structures is a recessed area.

8. The input device of claim 7, wherein the fastening member comprises a protrusion shaped to fit the recessed area.

9. The input device of claim 6, wherein each coupling structure of the plurality of coupling structures is a protrusion.

10. The input device of claim 9, wherein the fastening member comprises a recessed area shaped to fit over the protrusion.

11. The input device of claim 1, further comprising:
    a further lever, wherein the lever and the further lever are arranged symmetrically about the upper portion of the shaft.

12. The input device of claim 11, further comprising:
    a tension spring between the lever and the further lever, the tension spring configured to bias the fastening member to exert the force on the upper portion of the shaft in the direction at least substantially perpendicular to the height of the shaft.

13. The input device of claim 1, further comprising:
    a sensor configured to provide a sensing output based on the force received on the shaft.

14. The input device of claim 13, wherein the sensing output is indicative of at least one of a magnitude and a direction of the force received on the shaft.

15. The input device of claim 1, wherein the handle comprises a cap and a lever, the cap defining a plane at least substantially perpendicular to the height of the shaft.

16. The input device of claim 15, wherein the cap comprises an indentation, wherein the lever fits at least substantially into the indentation.

17. The input device of claim 1, further comprising:
    an extender coupled to the handle, the extender configured to at least partially enclose the upper portion of the shaft.

18. The input device of claim 17, further comprising:
    an enclosure comprising an outer wall and an inner wall, wherein the inner wall at least partially surrounds the shaft, and wherein the extender is arranged between the outer wall and the inner wall.

19. The input device of claim 18, wherein the extender is displaceable relative to the enclosure in a direction at least substantially parallel to the height of the shaft.

* * * * *